May 13, 1969     T. W. DUNCAN     3,443,719
GASKET FOR FRONT OPENING DISHWASHING MACHINES
Filed March 25, 1968
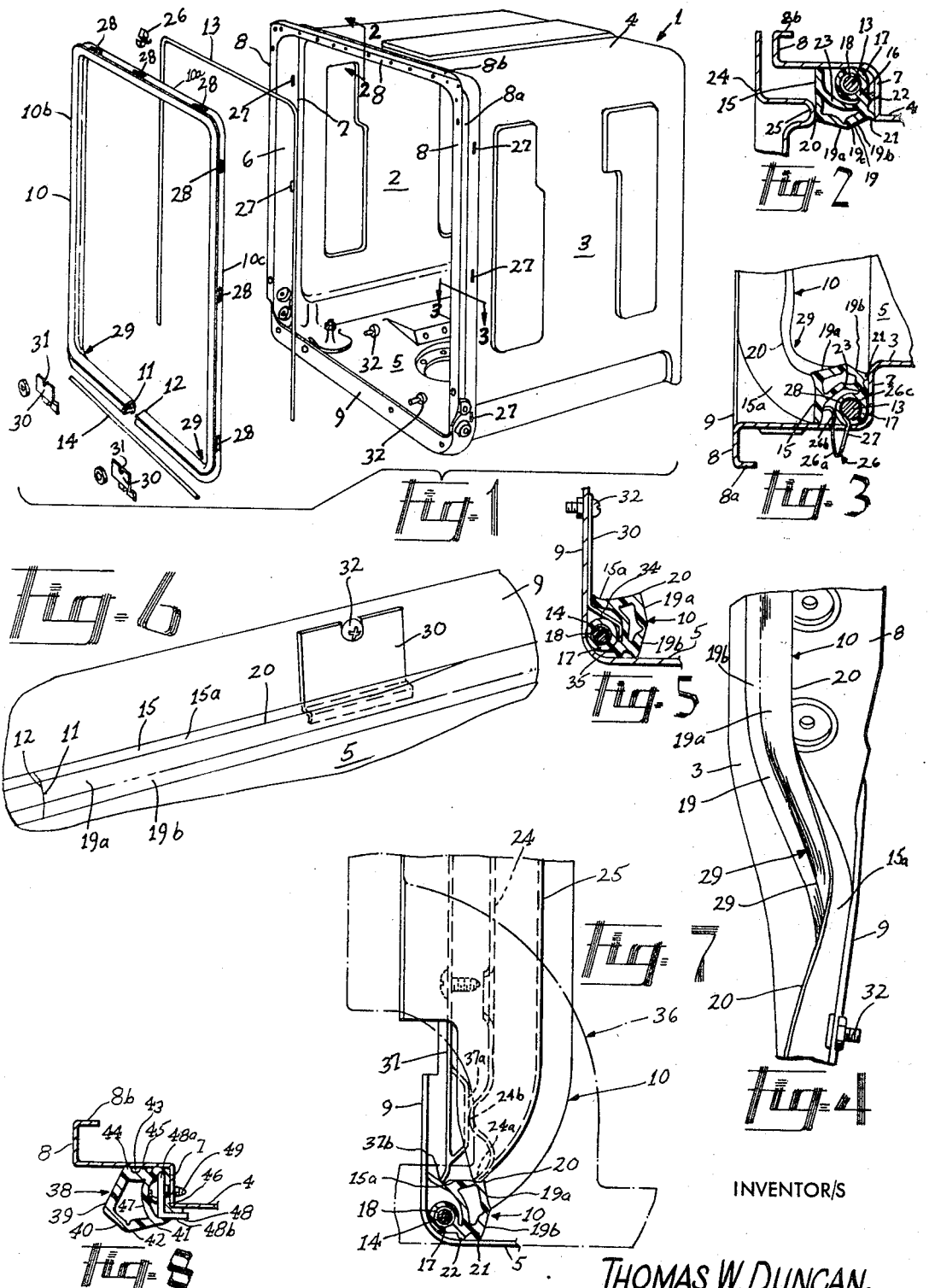
INVENTOR/S
THOMAS W. DUNCAN,
BY *Melville, Strasser, Foster and Hoffman*
ATTORNEYS

United States Patent Office 3,443,719
Patented May 13, 1969

3,443,719
GASKET FOR FRONT OPENING DISHWASHING MACHINES
Thomas W. Duncan, Connersville, Ind., assignor to Design and Manufacturing Corporation, Connersville, Ind., a corporation of Indiana
Filed Mar. 25, 1968, Ser. No. 715,591
Int. Cl. B21f 53/36
U.S. Cl. 220—46　　　　　　　　　　　　　　　6 Claims

ABSTRACT OF THE DISCLOSURE

A gasket means for an appliance of the type having a tub or vat with an access opening in the front wall thereof, and closure means for the access opening. The gasket means comprises an elongated resilient member. The resilient member is affixed to the vat along the horizontal top and vertical side portions of the access opening. At the lower corners of the access opening portions of the ends of the resilient member are bent 90° toward each other and are simultaneously provided with a 90° twist, whereby to form smooth compound curves affording a good seal at the bottom corners of the access opening with the mating edges of the closure means. The remainder of the end portions of the resilient member are affixed to the vat along the bottom edge of the access opening, terminating in facing surfaces.

BACKGROUND OF THE INVENTION

Field of invention

The invention relates to a gasket means, and more particularly to a gasket means for forming a seal between the closure member and the access opening in the vat of a front opening appliance such as a dishwashing machine or the like.

Description of the prior art

One of the most common types of dishwashing machines is that often referred to as a "front opening" dishwasher, wherein the vat or tub is located beneath a sink or countertop and wherein the dishwasher has a front opening door. The bottom edge of the door is hinged to the dishwasher cabinet, and the door is swingable between a vertical closed position and a substantially horizontal open position. Heretofore, the provision of a gasket means to form an adequate seal between the door and the vat opening has constituted a serious problem, particularly at the lower corners of the vat opening.

There have been a number of approaches to this problem. It has been common practice, for example, to lay an extruded gasket on the door itself, thus creating a seal when the door is pressed against a gasket compressing surface around the vat opening. In such an arrangement, however, the gasket is exposed to abuse when the door is in its open position. In addition, the usual contour of the inner surface of the door is not well adapted to retain a gasket around its edges.

It has been recognized that the above mentioned disadvantages would be overcome if a gasket means were located around the vat opening, and were compressed by the door in its closed position. As a result, prior art workers have turned to a two-piece gasket arrangement. A first gasket means has been affixed to the vat along the horizontal top and vertical sides of the access opening. The first gasket means terminated at the lower corners of the access opening. A second or "dam" gasket has been affixed to the tub along the horizontal bottom edge of the access opening. The ends of the second gasket have in one fashion or another been configured to meet or join the ends of the first gasket means. Difficulties have been encountered, however, in effecting a sufficiently smooth and correctly contoured joint between the two gasket means and leakage has occurred along the bottom of the access opening, particularly at the corners.

To counter this problem attempts have been made to provide gasket means which have been molded in whole or in part to provide the proper contour and smoothness at the lower corners of the access opening. Such gaskets are expensive, however, and have not been wholly satisfactory. For example, such molded gaskets cannot readily be adapted to small variations in the shape of the vat.

In accordance with the present invention, a one-piece resilient gasket means is provided, capable of being made by inexpensive extrusion processes. At the bottom corners of the access opening the gasket means is provided with both a 90° bend annd a 90° twist so as to form a smooth compound curve affording a good seal with the mating edges of the door.

SUMMARY OF THE INVENTION

The present invention contemplates a one-piece resilient gasket for use with appliances of the type having a vat or chamber with a front access opening and a door swingable between a vertical closed position and a substantially horizontal open position.

The resilient gasket means is hollow and (in the preferred embodiment) a portion of it contains a rod-like member. That portion of the resilient gasket member containing the rod-like element is bent in such a way as to have an inverted U-shaped configuration and is affixed to the vat in such a way as to lie along the top horizontal edge and the vertical side edges of the access opening. The ends of the resilient gasket means are affixed to the vat in such a way as to lie along the bottom horizontal edge of the access opening. The ends of the resilient means terminate in facing surfaces held together by a shorter rod-like element extending into both ends.

At the bottommost corners of the access opening, the resilient gasket means is provided not only with a 90° bend but also with a 90° twist so as to form a smooth compound curve affording a good seal with the mating edges of the door.

BRIEF DESCRIPTION OF THE DRAWINGS

FIG. 1 is an exploded view showing the vat of a dishwashing machine, the resilient gasket means, the rod-like elements and attachment means for affixing the gasket to the vat.

FIG. 2 is a cross sectional view taken along the section line 2—2 in FIG. 1 and further illustrating the point of contact between the gasket means and the inner liner of the dishwasher door.

FIG. 3 is a fragmentary cross sectional view taken along the section line 3—3 of FIG. 1 and illustrating the compound curve of the resilient gasket means at a lowermost corner of the access opening in the dishwasher vat.

FIG. 4 is a perspective view of the lower right hand corner of the access opening in the dishwasher vat, and illustrates the smooth compound curve of the gasket means.

FIG. 5 is a cross sectional view taken along the section line 5—5 of FIG. 1 and illustrating the gasket means and means for positioning the gasket in proper position.

FIG. 6 is a perspective view illustrating the joinder of the ends of the gasket along the lowermost edge of the access opening and showing means for maintaining the gasket in proper position.

FIG. 7 is a cross sectional view of the lowermost edge of the access opening illustrating the dishwasher door in closed position.

FIG. 8 is a cross sectional view similar to FIG. 2 showing another embodiment of the gasket and gasket retaining means.

DESCRIPTION OF THE PREFERRED EMBODIMENTS

While for purposes of an exemplary showing the gasket means of the present invention will be described as applied to a dishwashing machine of the front opening type, it will be understood that the use of a gasket means is not intended to be so limited. The gasket means of the present invention may be used with any appliance of the same general type including clothes washing machines and the like.

Front opening dishwashing machines come in various types including portable machines and those permanently mounted beneath a sink counter or the like. Such machines are characterized by a vat or washing chamber having a front opening. The front opening is closable by means of a door movable between a vertical closed position and a substantially horizontal open position. An outer casing is generally provided covering some or all of the vat. The dishwashing machine will be provided with various operating instrumentalities including one or more timing devices for controlling the cycles of operation of the machine, a motor, various valves, heating means, and others. In usual practice, the door may be made up of an outer member and an inner liner with certain operating instrumentalities located therebetween including detergent dispensing mechanisms and combination door latch and safety switch means. No attempt has been made to further describe the operating instrumentalities of the dishwashing machine since these are well known in the art and do not constitute a part of the present invention.

FIG. 1 is an exploded view illustrating a dishwashing machine vat generally indicated at 1, comprising side walls 2 and 3, top and bottom walls 4 and 5, and a rear wall (not shown). The front of the vat 1 comprises an access opening 6. That portion of the vat forming the access opening is of slightly larger external dimensions than the remainder of the vat so as to form a shoulder of inverted U-shaped configuration extending along the side walls 2 and 3 and the top wall 4. The shoulder is indicated at 7. The forwardmost edges of the vat along the vertical sides and horizontal top of the access opening may have a continuous laterally extending flange 8, portions of which extend rearwardly (as seen at 8a and 8b). Along the bottom of the access opening there is an upwardly extending flange 9 serving as a dam for the vat.

FIG. 1 also illustrates a resilient gasket member 10 terminating in ends 11 and 12 in facing relationship. A rod-like member 13 is also illustrated, together with a shorter rod-like member 14 by which the gasket ends 11 and 12 are joined. The interaction of these various parts will be described hereinafter.

FIGS. 2, 3 and 5 illustrate an exemplary cross sectional configuration of the resilient gasket means 10. The cross sectional configuration is substantially U-shaped. One leg 15 of the U has the gasket surface 15a to be contacted by a portion of the inner liner of the door and forming a watertight seal therewith. The other leg 16 of the U terminates in a tube-like configuration 17 forming a perforation 18 extending longitudinally of the resilient member 10 and intended to receive and surround the rod-like members 13 and 14. The legs 15 and 16 of the U-shaped configuration are joined by a base portion 19. The base 19 is made up of two planar portions 19a and 19b joined by a portion 19c of lesser thickness. The portion 19c permits sufficient resilient distortion of the gasket means 10 to enable a good seal between the vat and the inner liner of the door when the door is in closed position.

At the juncture of the base portion 19a and the leg 15 a longitudinally extending rib 20 is located on the gasket to aid in forming the seal between the gasket and the door liner. Similarly, a longitudinally extending rib 21 is formed between the juncture of leg 16 and base portion 19b. A second longitudinally extending rib 22 is also located on the leg 16. These ribs 21 and 22 aid in forming a good seal between the gasket means 10 and the vat.

Finally, the gasket means 10 has an arcuate web 23 extending between the leg portions 15 and 16 to aid in maintaining the proper configuration of the gasket means when compressed between the door liner and the vat.

The gasket means 10 may be made of any suitable resilient material by well known extrusion processes. For example, vinyl materials resistant to water and heat have been found satisfactory.

In assembly, a suitable length of the resilient gasket material is used, and the rod-like element 13 is threaded into the gasket perforation 18. The rod-like element 13 may be inserted into the gasket and then formed into the U-shaped configuration illustrated in FIG. 1, or the rod 13 may be formed, and the gasket means threaded thereon after forming. It will be evident from FIG. 1 that in the general rectangular configuration of the gasket assembly, the rod-like element will extend inside the gasket only along the horizontal top portion and the vertical side portions thereof. The rod-like member 13 does not extend through the lower corners or the lower horizontal portions of the gasket.

The smaller rod-like element 14 is then inserted half way into the gasket through the end 11 and half way into the gasket through the end 12 and aids in holding the gasket ends 11 and 12 in facing relationship. Insertion of the rod-like element 14 will complete the formation of the resilient member 10 into a rectangular configuration. Again it will be noted that the bottom corners of this rectangular configuration are free of the rod-like inserts.

With the rod-like elements 13 and 14 in place in the resilient gasket means 10, the assembly formed thereby is ready to be affixed to the tub. The horizontal top portion 10a and vertical side portions 10b and 10c (see FIG. 1) of the gasket assembly are adapted to lie along the shoulder 7 of the vat.

FIG. 2 is a cross sectional view taken along the section line 2—2 of FIG. 1, and illustrates the proper positioning of the gasket assembly on the shoulder 7 of the vat. The end portion of the leg 15 of the gasket together with the tubular portion 18 and ribs 21 and 22 of the leg 16 of the gasket will contact the vat and provide a watertight seal therewith.

The orientation of the gasket assembly on the shoulder 7 is such that the gasket surface 15a and rib 20, to be contacted by the door liner, face outwardly of the vat along the vat sides and top. As indicated in FIG. 2, the door or door liner 24 will have an inwardly extending gasket-contacting surface 25 along its top and side edges. The surface 25 is intended to contact the gasket surface 15a and rib 20 and to compress the gasket assembly so as to transmit the force as directly as possible to sealing rib 21, whereby to form a watertight seal with the shoulder 7. For purposes of clarity and to show the undistorted cross sectional configuration of gasket means 10, FIG. 2 illustrates the door liner 24 contacting, but not compressing, the gasket 10.

FIGS. 1 and 3 illustrate an exemplary means by which the gasket assembly may be affixed to the top and sides of the vat along the shoulder 7. Attachment of the gasket assembly to the vat may be accomplished by a plurality of clips, one of which is generally indicated at 26 in FIGS. 1 and 3. The clip comprises a U-shaped member made of resilient metal, plastic or the like. The legs of the clip are so configured as to form a wedge-shaped nose portion 26a and a constricted portion 26b. The ends of the legs flare outwardly and one of the legs terminates in a hook like configuration 26c.

As illustrated, the vat may be provided with a plurality of slots 27 located adjacent the shoulder 7. The tubular portion 17 of the resilient member 10 has a series of cooperating cut outs 28 which, when the gasket assembly is in place, lie opposite the slots 27.

As illustrated in FIG. 3, the hook-like portion 26c of a clip 26 may be caused to extend through each of the cut outs 28 in the resilient member and to engage the rod-like element 13. The wedge-shaped portion 26a of the clips may then be inserted in appropriate ones of the slots 27 in the vat. The clips are so configured that as they are inserted in the slots 27 the clip legs will approach each other until the wedge-shaped portions of the clips pass through the slots 27 whereupon the clips will snap into position with their restricted portions 26b engaging the slots 27. In this way, the gasket assembly will be firmly held to the sides and top of the vat adjacent the shoulder 7.

With the parts so assembled, the bottom portion of the gasket assembly may then be affixed to the dam 9. As will be evident from FIG. 4, where like parts have been given like index numerals, the bottom portion of the gasket assembly is brought forwardly against the dam 9 and is simultaneously twisted 90° in such a way that the gasket surface 15a extends upwardly. The gasket means 10 may be so twisted by virtue of the fact that there is no rod-like insert in that portion of it forming the bottom corners of the gasket assembly. This twisting of the gasket means 10, together with the fact that it is bent 90° to enable it to lie along the dam 9, produces a smooth, compound bottom corner curve generally indicated at 29. The compound curve 29 insures an adequate watertight seal between the door and the vat at the bottom corners of the access opening, and eliminates the necessity for specially molded gasket means or multi-piece gasket means.

FIGS. 5 and 6 illustrate the position of the gasket means along the dam 9 and the means for affixing the gasket in position. As seen in FIG. 6, the gasket means 10 lies along the dam 9 adjacent the vat bottom 5. The rod-like element 14 is inserted in the ends 11 and 12 of the gasket means (see FIG. 5) and maintains the ends 11 and 12 in facing relationship.

The facing relationship of gasket ends 11 and 12 may be an abutting relationship. However, the joinder of ends 11 and 12 by rod 14 enables adjustment of the gasket to insure that it is properly located in the lower corners of the access opening. After adjustment, and due to slight tolerance variations in the manufacturing process, a small gap may occur between gasket ends 11 and 12.

The gasket assembly may be affixed to the dam 9 by a pair of clip means 30 (see FIGS. 1, 5 and 6). Each clip means 30 comprises a plate-like structure having a vertical slot 31 in its upper edge. The slot is adapted to receive the shank of a bolt or machine screw 32 which extends through a perforation 33 in the dam. The slot 31 will permit a vertical adjustment of the clip 30 where necessary.

The clip 30 has a portion 34 slanting downwardly and outwardly, and another portion 35 slanting downwardly and inwardly. The portions 34 and 35 comprise a hook-like configuration. As is indicated in FIG. 5 this hook-like configuration is adapted to lie between the arcuate web 23 of the gasket means 10 and the tubular portion 17 of the gasket means. Thus, the tubular portion 17, containing the rod-like element 14, is engaged by the clip 30 and is held in position against the dam. The rod-like element 14 insures that the gasket is so positioned throughout its length along the dam. It will be noted from FIG. 5 that the tubular portion 17 of the gasket means 10, together with the longitudinally extending ribs 21 and 22 will insure a watertight seal between the gasket means 10 and the vat.

The gasket surface 15a will be engaged and slightly compressed by the bottom edge of the door liner and/or other members affixed to the lower edge of the door liner, as shown in FIG. 7.

The door of the dishwashing machine is provided with suitable hinge means, shown in broken lines and generally indicated at 36. When the door is in its closed position, the bottom edge 24a of the door liner 24 will contact the surface 15a and rib 20 of the gasket means 10. When so equipped, additional portions of the door assembly may contact the gasket means. For example, in some dishwashing machines part of the drying-vent system is located between the inner and outer door surfaces. As indicated in FIG. 7, the door may be provided with a baffle plate 37. The baffle plate may be provided with a series of bosses, one of which is shown at 37a. The door liner 24 may be provided with a cooperating series of bosses, one of which is shown at 24b. The bosses 37a and 24b are adapted to contact each other and to maintain the baffle plate 37 and door liner 24 in spaced relationship.

The bottom edge 37b of the baffle plate 37 may be so configured as to contact the surface 15a of the gasket means, when the door is in closed position. In this way, additional engagement of the gasket means by the door assembly is provided, to insure a good seal between the gasket means and the door.

The gasket means of the present invention is not limited to the cross sectional configuration shown in FIGS. 2, 3, 5 and 7. In addition, the invention is not limited to the use of the U-shaped rod member 13 and clip means 26. The gasket means may have any suitable cross sectional configuration permitting the gasket means to be properly bent and twisted, and enabling the gasket means to be compressed. Similarly, any suitable means may be used which will adequately affix the gasket means in position about the access opening of the dishwasher vat.

FIG. 8, similar to FIG. 2, illustrates another embodiment of the gasket and another means for affixing the gasket to the shoulder 7 of the dishwasher vat. In this instance, the gasket (generally indicated at 38) is again hollow and has a surface 39 adapted to be contacted by the surface 25 of the door liner 24. One side of the gasket is made up of two surfaces 40 and 41. The point of juncture 42 between the surfaces 40 and 41 is preferably of lesser thickness, so as to render the gasket more readily compressible. The other side 43 of the gasket has a pair of longitudinally extending ribs 44 and 45 adapted to make a sealing contact against the adjacent vat surface. The gasket side 43 terminates in a portion 46 lying along and slightly beyond the shoulder 7. In addition, the side 43 of the gasket and the gasket portion 41 are adjoined by a web 47.

In this embodiment, the gasket 38 is affixed to the shoulder 7 by means of an angle strip 48. The angle strip may be made of stainless steel or other suitable material. One leg 48a of the angle strip lies between the gasket web 47 and gasket portions 46. The leg 48a has a plurality of spaced perforations adapted to receive screws, one of which is shown at 49. The screws 49 pass through the leg 48a of the angle strip, the gasket portion 46 and the vat shoulder 7. In this way, the gasket 38 is held in position with the gasket portion 46 compressed in watertight fashion between the vat shoulder 7 and the leg 48a of the angle strip. The other leg 48b of the angle strip causes the edge of the gasket portion 46 to lie against the vat top 4 (or vat sides 2 and 3).

Modifications may be made in the invention without departing from the spirit of it.

The embodiments of the invention in which an exclusive property or privilege is claimed are defined as follows:

1. A gasket means for an appliance of the type having a vat, a rectangular access opening in the front of said vat, and a rectangular door for said access opening movable between a vertical closed position and a substantially horizontal open position, said door having surfaces for contacting said gasket means along the top, sides and bottom of said access opening, said gasket means comprising an elongated resilient member having a gasket surface extending longitudinally thereof to be contacted by said door surfaces, means for affixing said gasket means to said vat along said top of said access opening with said gasket surface facing outwardly of said vat, said gasket means bent through 90° at the upper corners of said access opening and means for affixing said gasket means to said vat along said sides of said access opening with said gasket surface facing outwardly of said vat, end portions of said gasket means being bent through 90° at the lower corners of said access opening and extending toward each other along said bottom of said access opening, said end portions terminating in facing surfaces, said end portions of said gasket means being twisted 90° at said bottom corners of said access opening whereby to form smooth compound curves in said gasket means at said bottom corners, and means for affixing said end portions to said vat along said bottom of said access opening with said gasket surface facing upwardly.

2. The structure claimed in claim 1 including a rod-like element having an inverted U-shaped configuration, said U-shaped configuration having a base portion and two downwardly extending legs, said elongated gasket means having a longitudinal perforation adapted to receive said rod-like element, said rod-like element being located within said gasket perforation with said base portion lying within said gasket portion extending along the top of said access opening and with said legs located within said gasket portions lying along the sides of said access opening, said rod-like element configuring said gasket means to lie along the top and sides of said access opening.

3. The structure claimed in claim 1 wherein said elongated gasket means has a longitudinally extending flange portion, said means for affixing said gasket to the top and sides of said access opening comprising at least one strip adapted to lie along said gasket flange and fastening means extending through cooperating spaced perforations in said strip, said gasket flange and said vat.

4. The structure claimed in claim 2 including a plurality of spaced slots in said gasket means exposing portions of said rod-like element, said vat having a plurality of cooperating slots along the top and sides of said access opening, said means for affixing said gasket means along the top and sides of said access opening comprising a plurality of clip means, each clip means extending through one of said slots in said vat and a cooperating one of said slots in said gasket means and engaging said rod-like element.

5. The structure claimed in claim 4 including a straight rod-like element inserted in said gasket perforation in both ends of said elongated gasket means, whereby to maintain said ends in said facing relationship.

6. The structure claimed in claim 5 wherein said means for affixing said end portions of said gasket along said bottom of said access opening comprise clip means affixed to said vat and engaging said portions of said gasket containing said straight rod-like element.

References Cited
UNITED STATES PATENTS

| | | | |
|---|---|---|---|
| 2,657,475 | 11/1953 | Erickson | 220—46 X |
| 3,022,550 | 2/1962 | Beckett et al. | 220—46 X |
| 3,161,925 | 12/1964 | Bertolini | 220—46 X |
| 3,217,921 | 11/1965 | Frehse | 220—46 |
| 3,330,435 | 7/1967 | MacDonnell | 220—46 |

GEORGE E. LOWRANCE, *Primary Examiner.*